Aug 5, 1941.  J. F. CULLIN  2,251,326
METHOD OF MAKING COMMUTATORS
Filed Sept. 7, 1937  2 Sheets-Sheet 2

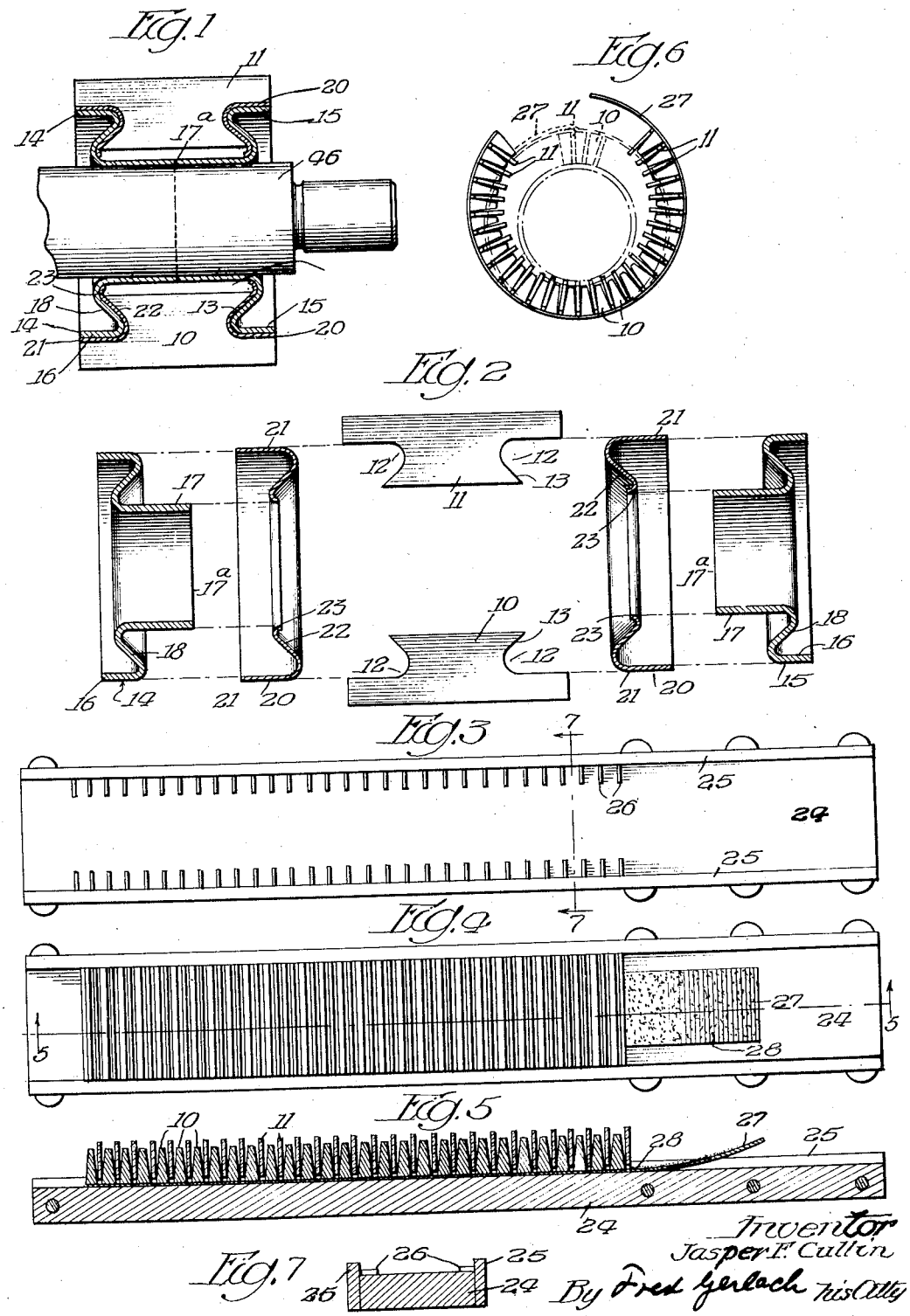

Inventor
Jasper F. Cullin
By Fred Gerlach
his Atty

Patented Aug. 5, 1941

2,251,326

UNITED STATES PATENT OFFICE 2,251,326

METHOD OF MAKING COMMUTATORS

Jasper F. Cullin, Detroit, Mich., assignor, by mesne assignments, of two-thirds to Lou Mervis, Chicago, Ill.

Application September 7, 1937, Serial No. 162,668

1 Claim. (Cl. 29—155.54)

The invention relates to commutators for armatures of electrical machines and the manufacture thereof.

In the assembly of commutators, it is now common practice to provide oppositely-facing wedge or V-shaped rings adjacent the ends of, and inter-locking with, the segments of copper and mica to secure the segments radially and circumferentially and to join the rings by a separate metallic sleeve having integral radial flanges lapping the outer sides of the rings.

One object of the invention is to provide an improved method of securing the segments together.

This object is attained by providing the wedge-ring members with abutting tubular extensions or hub-portions and welding the abutting edges together to secure the segments together. In this method, the rings used are of such shape that they can be readily wrought or pressed into the desired shapes. By welding the abutting edges of the tubular extensions together, the rings are united by a single operation and the separate sleeve and flanging heretofore necessary are dispensed with. This reduces the cost and simplifies the manufacture and results in forming a retaining sleeve which efficiently and securely retains the segments of copper or metal and insulating material in compact relation.

Another object of the invention is to provide a method by which the assembly of the segments of copper and insulating strips and the forming of the series of strips into an annular series, preparatory to receiving the locking-rings, is greatly facilitated. This object is accomplished by assembling the segments in a fixture and over a strip of material with an adhesive on one of its faces, whereby the segments will be held in their placed order while they are being rolled into an annulus, preparatory to the assembly of the segments and the retaining-rings.

Another object of the invention is to provide a commutator which is simple in construction and composed of a small number of parts which can be economically manufactured and in which the segments and retaining-elements are efficiently secured in assembled relation.

Other objects of the invention will appear from the detailed description.

The invention consists in the several novel features which are hereinafter set forth and which are more particularly defined by the claim at the conclusion hereof.

Figure 8:
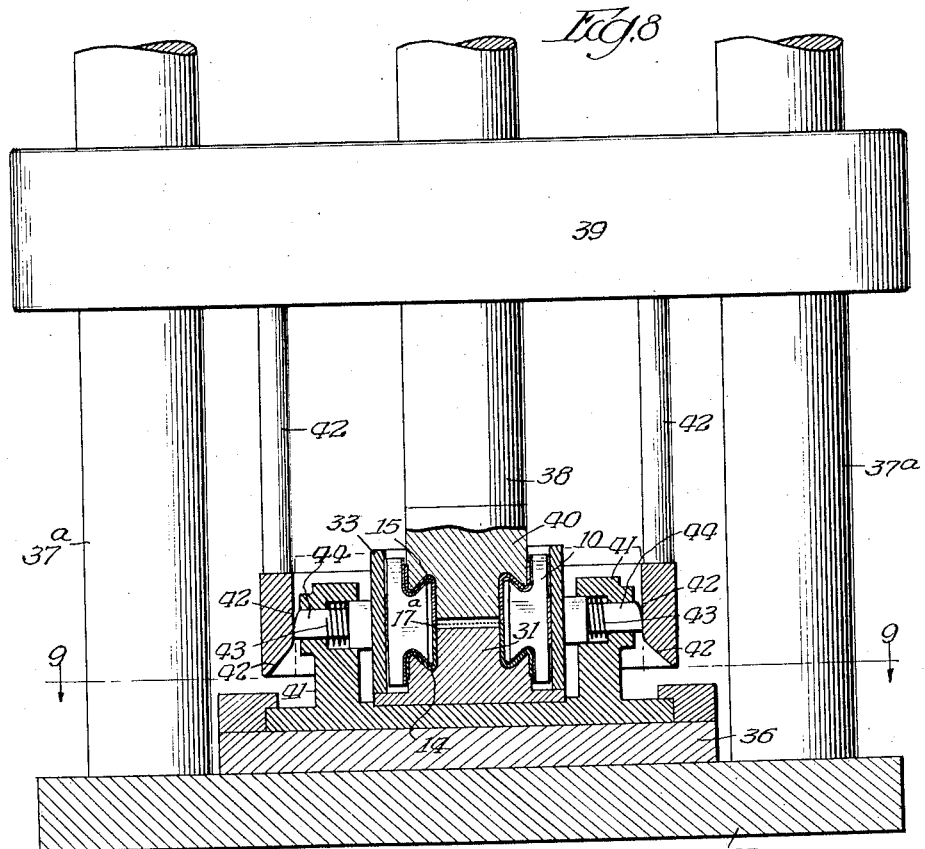
Figure 9:
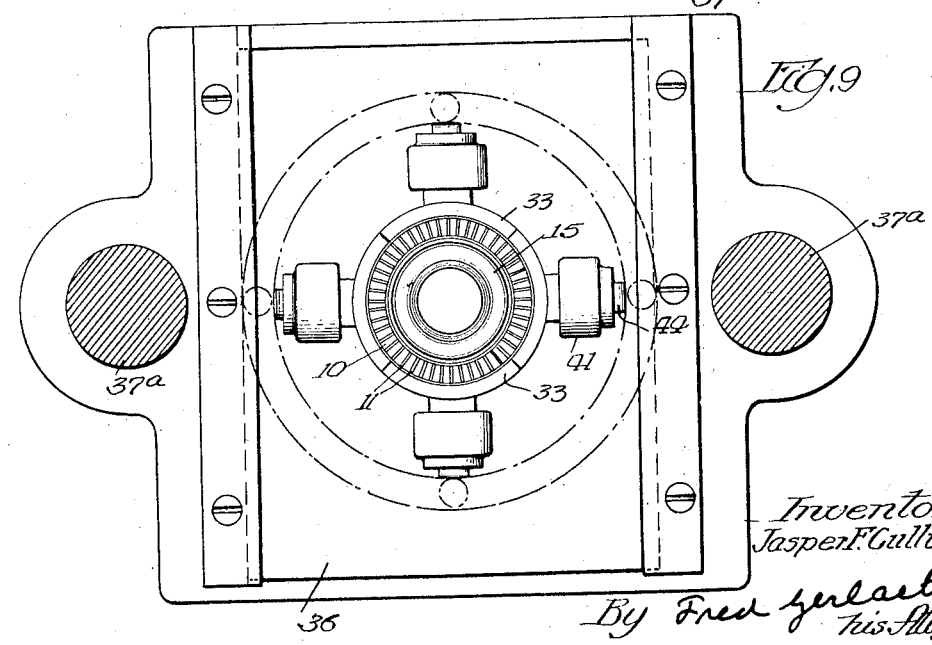

In the drawings: Fig. 1 is a longitudinal section of a commutator manufactured according to the improved method and embodying the invention. Fig. 2 is a view of the constituent parts of the commutator separated for illustrative purposes. Fig. 3 is a plan of a fixture for spacing the segments of a commutator for assembly. Fig. 4 is a plan of the fixture with a series of segments laid therein. Fig. 5 is a section on line 5—5 of Fig. 4. Fig. 6 is an elevation of a group of segments illustrating the manner of retaining the segments by the adhesive retaining strip, and assembling them into an annulus. Fig. 7 is a vertical section of a press and welder for illustrating the method of uniting the retaining rings to complete the commutator. Fig. 8 is a vertical section illustrating the method of assembling and welding the rings together. Fig. 9 is a section on line 9—9 of Fig. 8.

The invention is exemplified in a commutator composed of an annular series of segments 10 of conducting material, such as copper, separated from one another by strips or segments 11 of insulating material, such as mica. The inner portions of the ends of segments 10 and 11 have V-shaped notches 12 to form oppositely-inclined edges 13 whereby all of the segments may be locked together in an annular series by complementary wedge-rings 14 and 15 of steel. Each wedge-ring comprises an outer peripheral or tubular flange 16; a tubular inner or hub-portion 17 and a conoidal side-wall 18 between the outer end of hub-portion 17 and the inner end of the outer flange 16. The sides 18 of the rings 14 and 15 are oppositely inclined or inwardly divergent from their outer flanges 16. Each retaining ring is insulated from the copper segments 10 by a ring 20 of insulating material, such as mica. Each ring 20 comprises an outer tubular flange 21 and a conoidal portion 22 terminating in a bead 23. Rings 20 conform, respectively, to the flanges 16 and 17 and sides 18 of complementary retaining-rings 14 and 15, respectively, and are adapted to seat against and on the retaining-rings. The flanges 17 on the rings 14 and 15 are extended so their inner edges 17ª will substantially meet when the commutator is assembled, as hereinafter set forth. When the rings 14, 15 are secured together end-to-end, the conoidal walls 18 will act as wedges and, through rings 20, will draw the segments 10, 11 radially inward and into close contact with one another and lock them together against relative longitudinal or radial movement. The edges 17ª of rings 14 and 15 are welded together as hereinafter described to secure the segments in closely fitting relation. The commutator thus composed exemplifies one which comprises a pair of complementary retaining-rings directly joined together and which secure the segments without a separately formed sleeve between the rings.

For arranging the copper and mica segments in alternating order, a fixture is provided which comprises a flat base 24 and side-bars 25 projecting upwardly from the longitudinal margins of, and fixed to, the base. The spacing between bars 25 corresponds to the length of the segments. A series of ribs 26 is formed on the top face of and along each side of the base 24. These ribs are spaced apart longitudinally of the fixture a distance equal to the thickness of the copper segments 10 and have a thickness corresponding substantially to the thickness of the mica segments. The number of ribs provided is sufficient for receiving a full set of copper segments for a commutator. A strip 27 of flexible material, such as stout paper having its top face provided with suitable adhesive 28, is laid on the top-face of the base 24 between the spacer-ribs 26, as indicated in Fig. 4. The copper segments 10 are then dropped between the spacer-ribs 26 until the entire group for a commutator has been laid and is held in the fixture. The bottom edges of the segments will adhere to and be retained on the adhesive face of tape 27. Segments or strips 11 are laid between the segments 10 and on top of the spacer-ribs 26, as illustrated in Fig. 5. A portion of the strip 27 is left to project beyond one end of the series of assembled segments. When all of segments 10 and 11 have been laid in alternating relation in the fixture and with the segments 11 adhering to the strip 27, the latter is flexed into a roll to fold the segments into an annulus or an annular series, as illustrated in dotted lines in Fig. 6. The projecting end of the strip 27 is lapped over, and secured by means of the adhesive thereon, to the other end of the strip, so the segments will be retained together in roll form. This exemplifies an improved method of, and means for, assembling the segments into an annulus preparatory to securing them in the retaining-rings.

The mica rings 20 and the retaining-rings 14, 15 are then assembled, with the conoidal portions of the rings fitted into the recesses 12 in the ends of the segments 10, 11, and with the inner edge 17ᵃ of flanges 17 close together so that the rings can be welded together.

In uniting the rings 14, 15, to permanently secure the elements of the commutator together, a hydraulic press is used to force the retaining-rings and segments together, and an electric welder is used to weld the rings together. This press comprises a base 37, vertical guide-rods 37ᵃ, a cross-head 39 slidable on rods 37ᵃ, and a ram 38 which is operable from a fluid pressure cylinder.

A base-plate 36, which carries the lower electrode 31, is slidably mounted on the base 37 to permit the electrodes and commutator-assembly to be placed under and removed from beneath the ram of the press. Electrode 31 is shaped to engage and conform to the inner and outer peripheries and the outer face of the conoidal side of ring 15. An upper electrode 40 is shaped to engage and conform to the inner and outer peripheries, and the conoidal outer side of ring 14. The contiguous ends of the electrodes terminate adjacent the edges 17ᵃ of rings 14 and 15 and are adapted, when electric current is passed through them, to heat the rings and weld said edges together. The upper electrode 40 is adapted to be engaged by, or may be secured to, the lower end of ram 38, to force commutator-assembly together longitudinally between the electrodes.

While the retaining-rings 14, 15 are being welded together, the segments are forced together by radial pressure. For this purpose, the commutator-assembly is placed in a clamping-sleeve 33 composed of arcuate sections. Outwardly extending stems 44 are fixed to the segments 33, respectively, and guided in lugs 41 fixed to the base-plate 36. Abutments 42 with inclined and straight faces are fixed to the cross-head 39 and are adapted to engage the stems 44 to force the sections 33 inwardly before the rings 14 and 15 are welded together. Springs 43 are connected to the stems 44 and the lugs 41 to pull the segments 33 outwardly when they are released by the abutments 42.

In producing the commutators according to the present method, the assembled segments and retaining-rings are placed in the sleeve 33 and on the lower electrode 31. The upper electrode 40 is placed in the assembly. The base-plate 36 with the assembly and electrodes is moved to position the upper electrode under the raised ram 38. The ram is then lowered. During its downstroke, abutment 42 will engage stems 40 and force the sections of sleeve 33 radially inward and jam the segments 10, 11 together into tight-fitting relation. As the ram is lowered, electrode 40' is forced against ring 14 which will be pressed towards ring 15 and press the mica-rings 20 and the segments together longitudinally. While the commutator elements are thus pressed together radially and longitudinally, an electric current will be passed through and across the electrodes to weld the contiguous edges 17ᵃ of the rings 14, 15 together, so that they will, in effect, constitute a sleeve with integral sides and outer flanges, in which the inner ends of the segments are tightly and securely held against relative longitudinal or radial movement. In welding the rings 14 and 15 together, they are subjected to a high temperature while the segments remain comparatively cool. As the rings cool the whole assembly will be drawn tightly together, by reason of the contraction of the rings. The armature assembly may then be machined to its desired length. The hub of the united rings is adapted to be pressed on the armature-shaft 46. The wires may be connected to the segments 10 in any suitable manner.

The invention exemplifies a method of making commutators in which the abutting edges of the retaining-rings are welded together to permanently secure the segments together. This dispenses with the necessity of separately forming end-rings and an intermediate sleeve with flanges for securing the rings together. It also exemplifies a method of facilitating the arranging of the segments for rolling them into an annulus preparatory to assembly with the retaining-rings or elements. The invention also exemplifies a commutator in which the retaining-rings have integral hub-portions which are adapted to be shrunk onto the commutator-shaft.

The invention is not to be understood as restricted to the details set forth, since these may be modified within the scope of the appended claim, without departing from the spirit and scope of the invention.

Having thus described the invention, what I claim as new and desire to secure by Letters Patent is:

That improvement in the manufacture of commutators which comprises assembling together an annular series of segments having the inner portions of their ends provided with notches, assembling a pair of rings together axially with the segments between them, each ring being formed with a side adapted to enter the notches in one end of the segments to radially interlock the segments and rings and with an integral tubular extension projecting inward from its side, exerting pressure against the rings to force them together axially, subjecting the segments to inward radial pressure while the rings are forced together, and welding together the inner ends of the tubular extensions while the rings are pressed together and the segments are pressed radially inward, to autogenously unite the rings for permanently retaining the segments therebetween.

JASPER F. CULLIN.